DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 26, 1971

882 O.G. 1345

T882,013

RECOVERY OF VOLATILE LIQUID FROM UNDERGROUND STORAGE

J. G. Davis II, and David S. Dillard, Jr., Ponca City, Okla., assignors to Continental Oil Company, Ponca City, Okla., a corporation of Delaware

Filed May 6, 1969, Ser. No. 822,113
**Int. Cl. B65g *5/00;* E21f *17/16***
U.S. Cl. 61—.5
1 Sheet Drawing. 7 Pages Specification

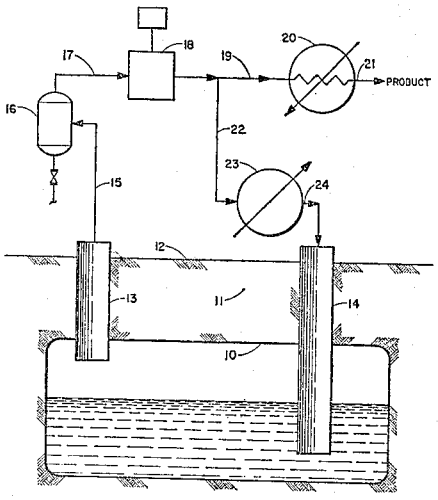

Volatile liquids such as ammonia or liquefied petroleum gas are recovered from storage in an underground cavern by withdrawing therefrom a stream of vaporized liquid. A portion of the vapor stream is compressed and condensed as product by cooling, and a second portion is heated and then returned to the cavern.

Jan. 26, 1971 J. G. DAVIS II, ET AL T882,013
RECOVERY OF VOLATILE LIQUID FROM UNDERGROUND STORAGE
Filed May 6, 1969
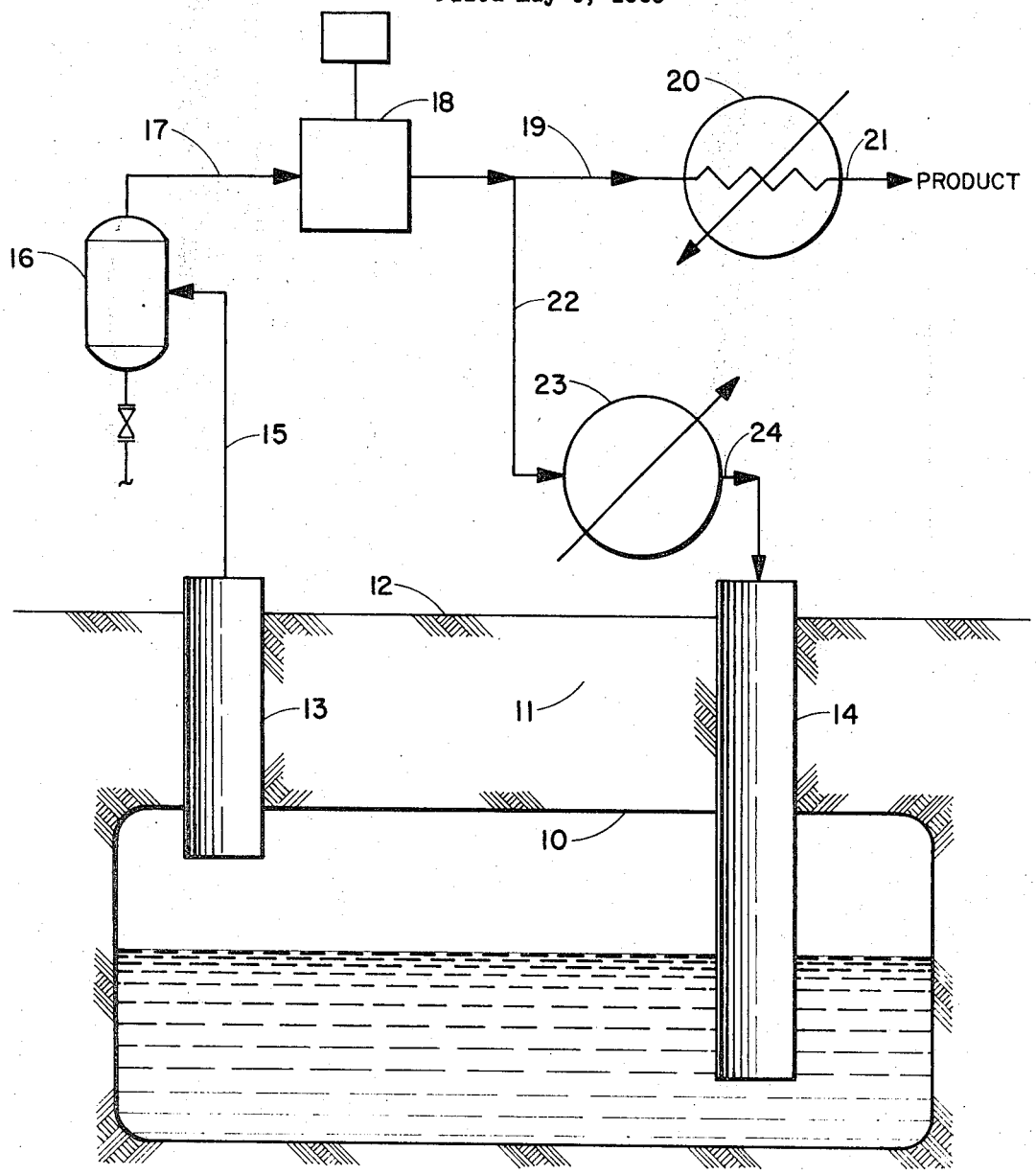
INVENTOR.
J. G. DAVIS II
DAVID S. DILLARD, JR.
BY
William A. Mikesell Jr.
ATTORNEY